United States Patent [19]

Delano

[11] Patent Number: 4,988,285

[45] Date of Patent: Jan. 29, 1991

[54] REDUCED NOX COMBUSTION METHOD

[75] Inventor: Mark A. Delano, Briarcliff Manor, N.Y.

[73] Assignee: Union Carbide Corporation, Danbury, Conn.

[21] Appl. No.: 394,036

[22] Filed: Aug. 15, 1989

[51] Int. Cl.⁵ .............................................. F23D 14/00
[52] U.S. Cl. ......................................... 431/5; 431/10; 431/175
[58] Field of Search ..................... 431/5, 10, 9, 12, 8, 431/175; 126/99 R, 110 R

[56] References Cited

U.S. PATENT DOCUMENTS

| | | | |
|---|---|---|---|
| 3,949,053 | 4/1976 | Gentry | 431/326 |
| 4,020,822 | 5/1977 | Harris | 126/110 R |
| 4,144,020 | 3/1979 | La Haye | 432/19 |
| 4,378,205 | 3/1983 | Anderson | 431/5 |
| 4,488,682 | 12/1984 | Kobayashi et al. | 239/132.3 |
| 4,541,796 | 9/1985 | Anderson | 431/187 |
| 4,541,798 | 9/1985 | Miller et al. | 431/266 |
| 4,693,680 | 9/1987 | Snyder et al. | 431/10 |
| 4,915,091 | 4/1990 | Vaney | 126/65 |

Primary Examiner—Larry Jones
Attorney, Agent, or Firm—Stanley Ktorides

[57] ABSTRACT

A combustion method enabling reduced $NO_x$ formation wherein fuel and oxidant are separately injected into a combustion zone in a defined velocity relation, combustion gases are aspirated into the oxidant stream prior to intermixture with the fuel, and the fuel is maintained free from contact with oxygen until the intermixture.

12 Claims, 1 Drawing Sheet

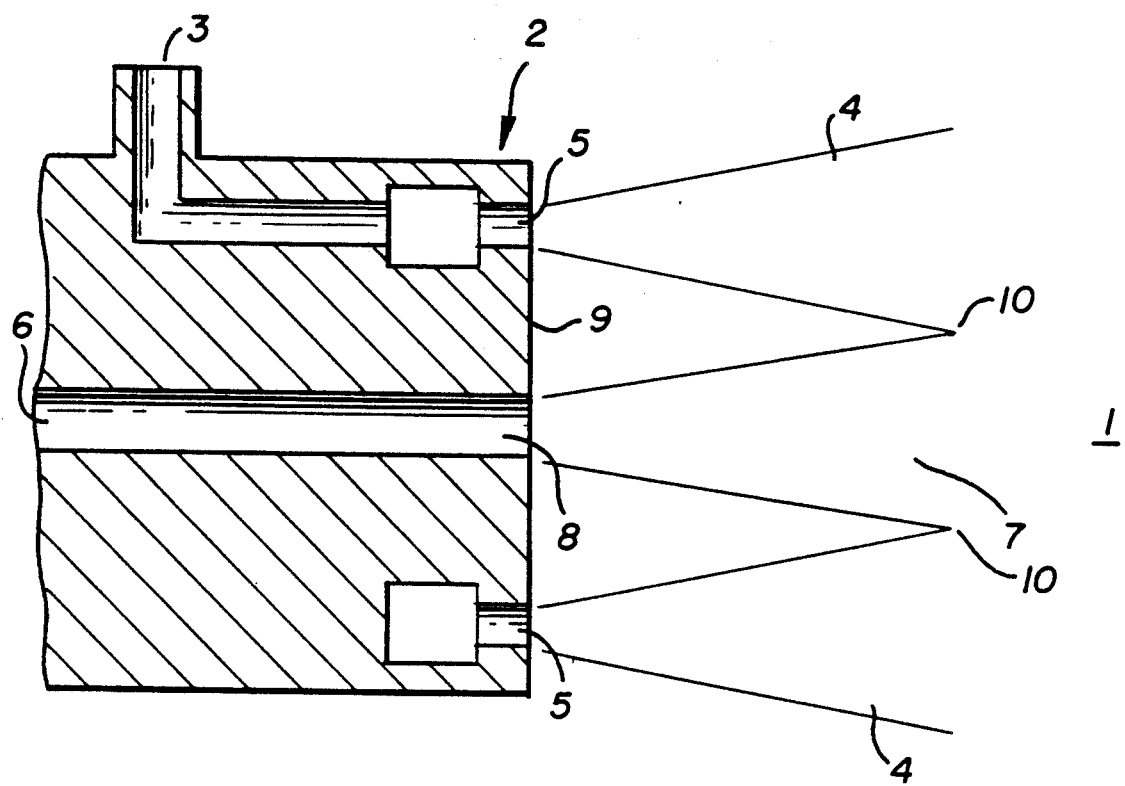

REDUCED NOX COMBUSTION METHOD

TECHNICAL FIELD

This invention relates generally to a combustion process wherein combustion products are aspirated into an oxidant stream prior to the combustion of the oxidant stream with fuel.

BACKGROUND ART

A recent significant advance in the burner art is the aspirator burner and combustion method developed by Dr. J. E. Anderson and described and claimed in U.S. Pat. Nos. 4,378,205 and 4,541,796. By means of this aspirator burner and process one can advantageously employ oxygen enriched air and even pure oxygen as the oxidant with resulting significantly improved operating efficiencies. The invention is characterized by a large radial distance between the fuel and oxidant injection points, said distance being at least four oxidant injection jet diameters, and is further characterized by a relatively high ratio of oxidant stream velocity to fuel stream velocity. Because of the large distance between the fuel and oxidant it is often desirable to provide a small amount of oxidant to the fuel as it enters the combustion zone to establish a flame front and thus have stable combustion.

The Anderson burner and combustion method enables the effective use of oxygen or oxygen-enriched air as the combustion oxidant while avoiding the very high heat associated with such combustion. This reduces both the furnace wear and the formation of nitrogen oxides, commonly referred to as $NO_x$. The heat reduction and dissipation is accomplished by the high oxidant velocity and the large distance between the oxidant and fuel injection points. The high oxidant velocity causes furnace gases to be aspirated into the oxidant stream at a high rate and the large distance enables this aspiration to continue for a considerable time before the oxidant and fuel meet and combust. The aspirated gases dilute and add momentum to the combustion reaction thus spreading it out and keeping spot temperatures from increasing to an unacceptable level.

A difficulty with this aspirator burner and method is that at higher average furnace temperatures and at higher firing rates, a greater spacing between the oxidant and fuel jets may be necessary to keep NOx production low, especially if the oxidant is less than 100 percent oxygen, i.e., contains some nitrogen.

Accordingly it is an object of this invention to provide an improved aspirating combustion method wherein $NO_x$ formation is reduced.

It is a further object of this invention to provide an improved aspirating combustion method employing oxidant which may contain some nitrogen while achieving reduced $NO_x$ formation.

SUMMARY OF THE INVENTION

The above and other objects which will become apparent to those skilled in the art upon a reading of this disclosure are attained by the present invention which is:

A method for combusting fuel and oxidant to achieve reduced formation of nitrogen oxides, comprising:

(A) heating a combustion zone to a temperature at least equal to 1500° F.;

(B) injecting into the heated combustion zone a stream of oxidant at a velocity within the range of from 200 to 1070 feet per second;

(C) injecting into the combustion zone, spaced from the oxidant stream, a fuel stream at a velocity such that the ratio of oxidant stream velocity to fuel stream velocity does not exceed 20;

(D) aspirating combustion gases into the oxidant stream and thereafter intermixing the aspirated oxidant stream and fuel stream to form a combustible mixture;

(E) combusting the combustible mixture to produce combustion gases for the aspiration of step (D); and (F) maintaining the fuel stream substantially free from contact with oxidant prior to the intermixture with aspirated oxidant of step (D).

BRIEF DESCRIPTION OF THE DRAWING

The sole figure is a cross-sectional representation of one burner which may be used to carry out the combustion method of this invention.

DETAILED DESCRIPTION

The combustion method of this invention will be described in detail with reference to the Drawing.

Referring now to the Figure, combustion zone 1 is preheated to a temperature of at least 1500° F. and preferably to at least about 1700° F. Generally the combustion zone will be preheated to a temperature within the range of from 1500 to 3200° F. Any effective method for heating the combustion zone to the desired temperature may be used with the combustion method of this invention. One such method is combustion carried out with stabilizing oxygen injected adjacent the fuel. Another such method is combustion with auxiliary air burners.

After the combustion zone has been heated to the appropriate temperature, fuel and oxidant are injected into the combustion zone. The oxidant may be air, oxygen enriched air, or technically pure oxygen having an oxygen concentration in excess of 99.5 percent. The advantages of the method of this invention over known methods are more clearly seen when the oxidant contains some nitrogen, especially when the nitrogen content exceeds about 3 percent. The fuel may be any suitable qaseous or liquid fuel such as methane, propane, coke oven gas or natural gas.

Referring back to the Figure, oxidant is supplied to burner 2 through conduit 3 which is in flow communication with a source of such oxidant. Oxidant is injected into combustion zone 1 as one or more streams 4 through a corresponding number of nozzles 5. The oxidant is injected into combustion zone 1 at a velocity within the range of from 200 to 1070 feet per second (fps), preferable within the range of from 500 to 1070 fps.

Fuel is supplied to burner 2 through conduit 6 which is in flow communication with a source of such fuel. The fuel is injected into combustion zone 1 as one or more streams 7 through a corresponding number of nozzles 8. The oxidant is injected into combustion zone 1 at a velocity such that the ratio of oxidant stream velocity to fuel stream velocity at their respective injection points does not exceed 20, preferably is less than 10, and most preferably is within the range of 1 to 5.

The fuel and oxidant are injected into the combustion zone in a spaced relation so that they do not contact one another until both fuel and oxidant streams have traversed a distance into combustion zone 1 from burner face 9. The distance between the fuel and oxidant injection points may be any effective distance and preferably is within the range of 4 to 20 oxidant stream diameters, said diameter being measured at the oxidant stream injection point into the combustion zone.

Furnace gases within combustion zone 1 are aspirated into oxidant stream 4 as it traverses through combustion zone 1. The furnace gases may be any specie within the combustion zone and are primarily combustion gases such as carbon dioxide, water vapor and other products of combustion. As mentioned, the furnace gases are aspirated into oxidant stream 4 as it traverses through combustion zone 1 from burner face 9. Thereafter the aspirated oxidant stream contacts and mixes with fuel stream 7 such as at point 10. The mixing of aspirated oxidant stream 4 and fuel stream 7 forms a combustible mixture which combusts to release heat to the combustion zone. The combustion also produces combustion gases for use in the aforedescribed aspiration.

It is an important aspect of this invention that the fuel stream be maintained substantially free from contact with oxygen prior to the abovedescribed mixing of the fuel stream with the aspirated oxidant. Accordingly, a stabilizing oxidant stream, such as an annular stream around the fuel stream, is not employed in the invention. In this way there is no combustion of fuel with oxidant unless and until the oxidant has been aspirated with combustion gases. This helps to reduce the formation of $NO_x$ over that which would otherwise be formed. Despite the lack of stabilizing oxidant, the combustion reaction proceeds without instability due to the defined preheating of the combustion zone and due to the defined relatively low ratio of oxidant stream to fuel stream velocity as they proceed through the combustion zone toward their intermixture.

The following examples and comparative examples serve to further illustrate the invention or serve to demonstrate the advantages of the invention over the prior art. The examples are not intended to be limiting.

EXAMPLE 1

The combustion method of this invention was carried out with a combustion system similar to that illustrated in the Figure. The combustion zone was preheated to a temperature of 2700° F. The fuel was natural gas and was injected into the combustion zone in a single stream at a velocity of about 40 fps. The oxidant had an oxygen concentration of 50 percent with the remainder being substantially nitrogen. The oxidant was injected into the combustion zone in eight streams equidistantly spaced around the fuel stream with each stream spaced from the fuel stream by a distance along the burner face of 7.2 oxidant stream diameters. The oxidant streams were injected into the combustion zone at a velocity of 720 fps; thus the oxidant stream velocity to fuel stream velocity ratio was about 18.

The fuel and oxidant were injected into the combustion zone at flowrates such that there was available about 2 percent oxygen in excess of the stoichiometric combustion requirement. The combustion effluent was analyzed for $NO_x$ and the $NO_x$ formation was determined to be 0.12 lbs. per million BTU.

The experiment was repeated except that about 5 percent of the oxidant was injected into the combustion zone as an annular stream adjacent the fuel stream. Thus the fuel was not maintained free from contact with oxygen until the downstream intermixture with the main oxidant. The $NO_x$ formation was determined to be 0.21 lbs. per million BTU.

Under the conditions reported in this Example 1, the method of this invention enabled a 43 percent reduction in the formation of $NO_x$ over that attained when the method of the invention was not employed.

EXAMPLE 2

The procedures reported in Example 1 were repeated except that the fuel and oxidant flowrates were such that there was available about 6 percent oxygen in excess of the stoichiometric oxygen requirement. The $NO_x$ formation was 0.33 lbs. per million BTU for the method of the invention and 0.40 lbs. per million BTU for the combustion employing 5 percent of the oxygen as an annular stream around the fuel stream. Under the conditions reported in this Example 2, the method of this invention enabled a 17.5 percent reduction in the formation of $NO_x$ over that attained when the method of the invention was not employed.

EXAMPLE 3

The procedures reported in Example 1 were repeated except that the combustion zone was preheated to 2740° F. and the oxidant had an oxygen concentration of 90 percent with the remainder being about half nitrogen and half argon. The $NO_x$ formation was 0.07 lbs. per million BTU for the method of the invention and 0.11 lbs. per million BTU for the combustion employing 5 percent of the oxygen as an annular stream around the fuel stream. Under the conditions reported in this Example 3, the method of this invention enabled a 36 percent reduction in the formation of $NO_x$ over that attained when the method of the invention was not employed.

EXAMPLE 4

The procedures reported in Example 3 were repeated except that the fuel and oxidant flowrates were such that there was available about 6 percent oxygen in excess of the stoichiometric oxygen requirement. The $NO_x$ formation was 0.11 lbs. per million BTU for the method of the invention and 0.16 lbs. per million BTU for the combustion employing 5 percent of the oxygen as an annular stream around the fuel stream. Under the conditions reported in this Example 4, the method of this invention enabled a 31 percent reduction in the formation of $NO_x$ over that attained when the method of the invention was not employed.

EXAMPLE 5

The procedures reported in Example 3 were repeated except that the combustion zone was preheated to 2750° F. The oxidant velocity was 500 fps and the fuel velocity was 100 fps; thus the oxidant to fuel velocity ratio was 5.0. No annular oxidant was employed. The $NO_x$ formation was 0.03 lbs. per million BTU. The above-described procedure was repeated except that the fuel velocity was 28 fps; thus the oxidant to fuel velocity ratio was 17.85. The $NO_x$ formation was 0.07 lbs. per million BTU. Under the conditions reported in this Example 5 the most preferred method of this invention enabled a 73 percent reduction in the formation of $NO_x$ over the 0.11 lbs per million BTU attained when the method of the invention was not employed as reported in Example 3, and, furthermore, the less preferred method of this invention enabled a 36 percent $NO_x$ reduction over that method.

Now with the use of the method of this invention, one can carry out combustion with a high oxygen concentration while reducing $NO_x$ formation still further below the low $NO_x$ formation possible with the heretofore available method.

Although the invention has been described in detail with reference to certain embodiments, those skilled in the art will recognize that there are other embodiments of the invention within the spirit and scope of the claims.

I claim:

1. A method for combusting fuel and oxidant to achieve reduced formation of nitrogen oxides, comprising:
   (A) heating a combustion zone to a temperature at least equal to 1500° F.;
   (B) injecting into the heated combustion zone a stream of oxidant at a velocity within the range of from 200 to 1070 feet per second;
   (C) injecting into the combustion zone, spaced from the oxidant stream, a fuel stream at a velocity such that the ratio of oxidant stream velocity to fuel stream velocity does not exceed 20;
   (D) aspirating combustion gases into the oxidant stream and thereafter intermixing the aspirated oxidant stream and fuel stream to form a combustible mixture;
   (E) combusting the combustible mixture to produce combustion gases for the aspiration of step (D); and
   (F) maintaining the fuel stream substantially free from contact with oxidant prior to the intermixture with aspirated oxidant of step (D).

2. The method of claim 1 wherein the combustion zone is heated to a temperature at least equal to 1700° F.

3. The method of claim 1 wherein the oxidant is air.

4. The method of claim 1 wherein the oxidant is oxygen-enriched air.

5. The method of claim 1 wherein the oxidant is technically pure oxygen.

6. The method of claim 1 wherein the oxidant contains at least 3 percent nitrogen.

7. The method of claim 1 wherein the oxidant velocity is within the range of from 500 to 1070 feet per second.

8. The method of claim 1 wherein the fuel is natural gas.

9. The method of claim 1 wherein the oxidant stream velocity to fuel stream velocity ratio is less than 10.

10. The method of claim 1 wherein the oxidant stream velocity to fuel stream velocity ratio is within the range of from 1 to 5.

11. The method of claim 1 wherein the fuel and oxidant streams are separated at their injection points into the combustion zone by a distance within the range of from 4 to 20 oxidant stream injection diameters.

12. The method of claim 1 wherein 2 or more oxidant streams are injected into the combustion zone.

* * * * *